(12) United States Patent
Shemyatovskiy

(10) Patent No.: US 11,008,877 B2
(45) Date of Patent: May 18, 2021

(54) TURBINE, GAS TURBINE INCLUDING THE SAME, AND METHOD OF ASSEMBLING AND DISASSEMBLING THE SAME

(71) Applicant: DOOSAN HEAVY INDUSTRIES & CONSTRUCTION CO., LTD., Changwon-si (KR)

(72) Inventor: Victor Shemyatovskiy, Changwon-si (KR)

( * ) Notice: Subject to any disclaimer, the term of this patent is extended or adjusted under 35 U.S.C. 154(b) by 93 days.

(21) Appl. No.: 16/505,731

(22) Filed: Jul. 9, 2019

(65) Prior Publication Data
US 2020/0056492 A1    Feb. 20, 2020

(30) Foreign Application Priority Data
Aug. 17, 2018 (KR) .......................... 10-2018-0096110

(51) Int. Cl.
*F01D 5/30* (2006.01)
*F01D 5/08* (2006.01)

(52) U.S. Cl.
CPC ........... *F01D 5/3015* (2013.01); *F01D 5/085* (2013.01); *F05D 2240/55* (2013.01); *F05D 2240/80* (2013.01); *F05D 2260/31* (2013.01)

(58) Field of Classification Search
CPC ........ F01D 11/006; F01D 5/085; F01D 5/326; F01D 5/3015
See application file for complete search history.

(56) References Cited

U.S. PATENT DOCUMENTS

| | | | |
|---|---|---|---|
| 3,853,425 A | 12/1974 | Scalzo | |
| 5,261,759 A | 11/1993 | Decoux | |
| 5,662,458 A | 9/1997 | Owen | |
| 8,096,776 B2 * | 1/2012 | Bluck | F01D 5/3015 416/221 |
| 8,105,041 B2 * | 1/2012 | Brillert | F01D 5/3015 416/221 |
| 2008/0008593 A1 * | 1/2008 | Zagar | F01D 5/3015 416/220 R |
| 2012/0039719 A1 * | 2/2012 | Ahaus | F01D 5/326 416/220 R |
| 2013/0294927 A1 * | 11/2013 | Dimmick, III | F01D 11/006 416/96 R |

(Continued)

FOREIGN PATENT DOCUMENTS

KR   10-1878360 B1   7/2018

OTHER PUBLICATIONS

A Korean Office Action dated Sep. 27, 2019 in connection with Korean Patent Application No. 10-2018-0096110 which corresponds to the above-referenced U.S. application.

*Primary Examiner* — Justin D Seabe
*Assistant Examiner* — Ryan C Clark

(57) ABSTRACT

A turbine, a gas turbine including the same, and a method of assembling and disassembling the same, capable of ensuring stable sealing performance as well as facilitating assembly and disassembly are provided. The turbine may include a rotor disk having a lower hook, a plurality of turbine blades installed on an outer peripheral surface of the rotor disk, each of the turbine blades having a blade hook located above the lower hook, and a retainer sealing a cooling passage defined between the turbine blade and the rotor disk and supported by the blade hook and the lower hook.

16 Claims, 12 Drawing Sheets

(56) References Cited

U.S. PATENT DOCUMENTS

| | | | | |
|---|---|---|---|---|
| 2015/0369062 | A1* | 12/2015 | Tanaka | F01D 11/006 415/208.1 |
| 2016/0130977 | A1* | 5/2016 | Snyder | F01D 5/3015 60/805 |
| 2017/0037736 | A1* | 2/2017 | Dungs | F01D 5/3015 |
| 2018/0298766 | A1* | 10/2018 | Jung | F01D 5/30 |
| 2020/0056485 | A1* | 2/2020 | Shemyatovskiy | F01D 5/3007 |

* cited by examiner

TURBINE, GAS TURBINE INCLUDING THE SAME, AND METHOD OF ASSEMBLING AND DISASSEMBLING THE SAME

CROSS-REFERENCE TO RELATED APPLICATION

This application claims priority to Korean Patent Application No. 10-2018-0096110, filed on Aug. 17, 2018, the entire disclosure of which is incorporated herein by reference in its entirety.

BACKGROUND

Field

Apparatuses and methods consistent with exemplary embodiments relate to a turbine, a gas turbine including the same, and a method of assembling and disassembling the same.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

The gas turbine includes a compressor, a combustor, and a turbine. The compressor sucks and compresses outside air, and transmits it to the combustor. The air compressed in the compressor is in a high-pressure and high-temperature state. The combustor mixes the compressed air introduced from the compressor with fuel and burns a mixture thereof. The combustion gas produced by the combustion is discharged to the turbine. Turbine blades in the turbine are rotated by the combustion gas, thereby generating power. The generated power is used in various fields, such as generating electric power and actuating machines.

Various attempts have been made to improve the efficiency of a gas turbine, and one of them is to reduce a leakage of combustion gas. That is, a gap is formed between the end of a turbine and a housing, resulting in one of main paths through which combustion gas leaks. Therefore, there is a need for a sealing means to block the leakage.

In order to seal cooling gas flowing from a rotor disk and form a flow path, a retainer is installed adjacent to a blade and the rotor disk. A conventional retainer is tightly fitted to the side of the blade or the rotor disk or fixed thereto by a fastening member.

However, this conventional method is problematic in that a large number of members are required for assembly and work efficiency is remarkably low due to very complicated assembly and disassembly processes. In particular, this method results in very low work efficiency because of undergoing a complicated process even when one turbine blade needs to be replaced.

SUMMARY

Aspects of one or more exemplary embodiments provide a turbine, a gas turbine including the same, and a method of assembling and disassembling the same, capable of ensuring stable sealing performance as well as facilitating assembly and disassembly.

Additional aspects will be set forth in part in the description which follows and, in part, will become apparent from the description, or may be learned by practice of the exemplary embodiments.

According to an aspect of an exemplary embodiment, there is provided a turbine including: a rotor disk having a lower hook; a plurality of turbine blades installed on an outer peripheral surface of the rotor disk, each of the turbine blades having a blade hook located above the lower hook; and a retainer sealing a cooling passage defined between the turbine blade and the rotor disk and supported by the blade hook and the lower hook.

The rotor disk may include a disk hook located between the blade hook and an adjacent blade hook, and the retainer may be supported at an upper end by the blade hook and the disk hook.

The retainer may include a sealing plate fixed to the turbine blade, a stopper plate spaced apart from the sealing plate to face the sealing plate, and a fixture inserted into the sealing plate and the turbine blade to press the sealing plate against the turbine blade, and the stopper plate may be latched by the blade hook, the disk hook, and the lower hook.

The sealing plate may be coupled to each of the turbine blades, the sealing plate may be spaced apart from an adjacent sealing plate, and a side of the stopper plate may be in contact with a side of an adjacent stopper plate.

The fixture may include a fastening part having a thread on an outer peripheral surface, and a head part coupled to the fastening part to press the sealing plate, and the head part may be installed through the stopper plate.

The stopper plate may include a hole formed for insertion of the fixture, and a stepped groove expanded outward on a circumference of the hole, the fixture may include a fastening part having a thread on an outer peripheral surface, and a head part coupled to the fastening part to press the sealing plate, and the head part may include a flange part protruding and inserted into the stepped groove.

The turbine blade may further include an airfoil-shaped blade part, a root part inserted into a slot formed in the rotor disk, and a platform part located between the blade part and the root part, and the blade hook may protrude from the platform part.

The turbine blade may further include a support rib covering the disk hook, and the blade hook may protrude downward from the support rib.

The stopper plate may be fitted to adjacent stopper plates.

The stopper plate may have a support groove formed on one side thereof and a support protrusion formed on the other side thereof, the support protrusion being inserted into a support groove of an adjacent stopper plate.

The lower hook may have a detaching groove formed for installation of the retainer.

According to an aspect of another exemplary embodiment, there is provided a gas turbine including: a compressor configured to compress air introduced from an outside; a combustor configured to mix compressed air compressed by the compressor with fuel for combustion; and a turbine. The turbine may include a rotor disk having a plurality of slots formed therein, a plurality of turbine blades rotated by combustion gas produced by the combustor, each of the turbine blades being inserted into an associated one of the slots, and a retainer sealing a cooling passage defined between the rotor disk and the turbine blade, and the retainer may be supported at an upper and a lower ends by a hook formed on the rotor disk and a hook formed on the turbine blade.

The rotor disk may include a lower hook and a disk hook located above the lower hook, the lower hook may be formed to extend, and the disk hook may be intermittently formed. The turbine blade may include a blade hook located between the disk hook and an adjacent disk hook. The upper end of the retainer may be supported by the disk hook and the blade hook and the lower end of the retainer may be supported by the lower hook.

The retainer may include a sealing plate fixed to the turbine blade, a fixture inserted into the sealing plate and the turbine blade to press the sealing plate against the turbine blade, and a stopper plate covering the sealing plate and latched by the disk hook, the blade hook, and the lower hook.

The sealing plate may be coupled to each of the turbine blades, the sealing plate may be spaced apart from an adjacent sealing plate, and a side of the stopper plate may be in contact with a side of an adjacent stopper plate.

The stopper plate may be spaced apart from the sealing plate.

The lower hook may have a detaching groove formed for installation of the retainer.

According to an aspect of another exemplary embodiment, there is provided a method of assembling a turbine including a turbine blade having a blade hook and a rotor disk having a disk hook and a lower hook including: inserting the turbine blade into a slot formed in the rotor disk; inserting a sealing plate and a stopper plate between the lower hook, the disk hook, and the blade hook through a detaching groove formed in the lower hook; fastening a fixture to the sealing plate and the stopper plate; moving the sealing plate and the stopper plate, which are supported by the blade hook, the disk hook, and the lower hook, in a circumferential direction of the rotor disk; and fastening the fixture to the turbine blade to press the sealing plate by a head part of the fixture.

According to an aspect of another exemplary embodiment, there is provided a method of disassembling a turbine including a turbine blade having a blade hook and a rotor disk having a disk hook and a lower hook including: separating a fixture, which fixes a sealing plate and a stopper plate, from the turbine blade; pressing the stopper plate to insert side ends between adjacent stopper plates and reduce a distance between centers of the stopper plates and define an open space; and separating an exposed turbine blade from the rotor disk.

It is to be understood that both the foregoing general description and the following detailed description are exemplary and explanatory and are intended to provide further explanation of the disclosure as claimed.

BRIEF DESCRIPTION OF THE DRAWINGS

The above and other aspects will be more apparent from the following description of the exemplary embodiments with reference to the accompanying drawings, in which.

DESCRIPTION

Figure 1:
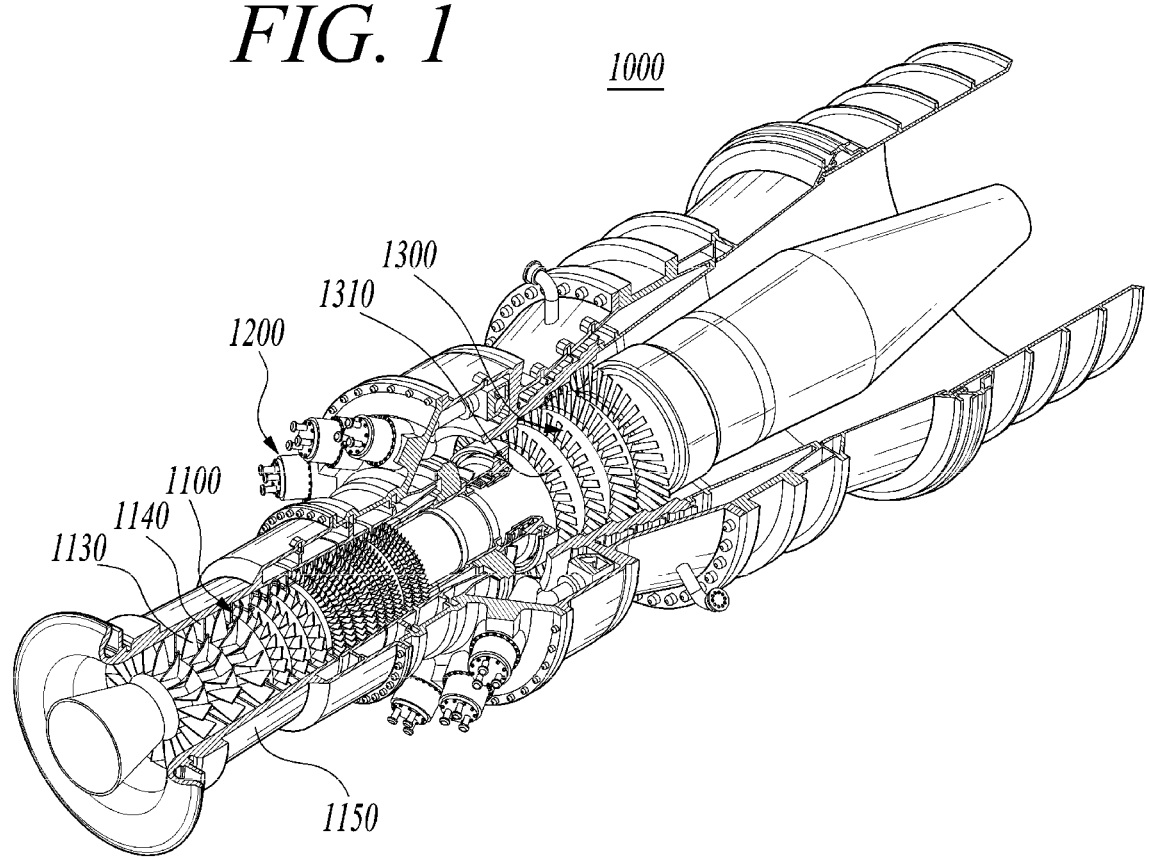
FIG. 1 is a view illustrating an inside of a gas turbine according to an exemplary embodiment.

Various modifications may be made to the embodiments of the disclosure, and there may be various types of embodiments. Specific embodiments are illustrated in the drawings and will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used in the present disclosure is for the purpose of describing particular embodiments only and is not intended to limit the scope of the disclosure. As used herein, the singular forms "a", "an" and "the" are intended to include the plural forms as well, unless context clearly indicates otherwise. In this specification, the terms "comprises/includes" and/or "comprising/including" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Exemplary embodiments will be described below in more detail with reference to the accompanying drawings. In order to clearly illustrate the disclosure in the drawings, some of the elements that are not essential to the complete understanding of the disclosure may be omitted, and like reference numerals refer to like elements throughout the specification.

Hereinafter, a gas turbine according to an exemplary embodiment will be described.

Figure 2:
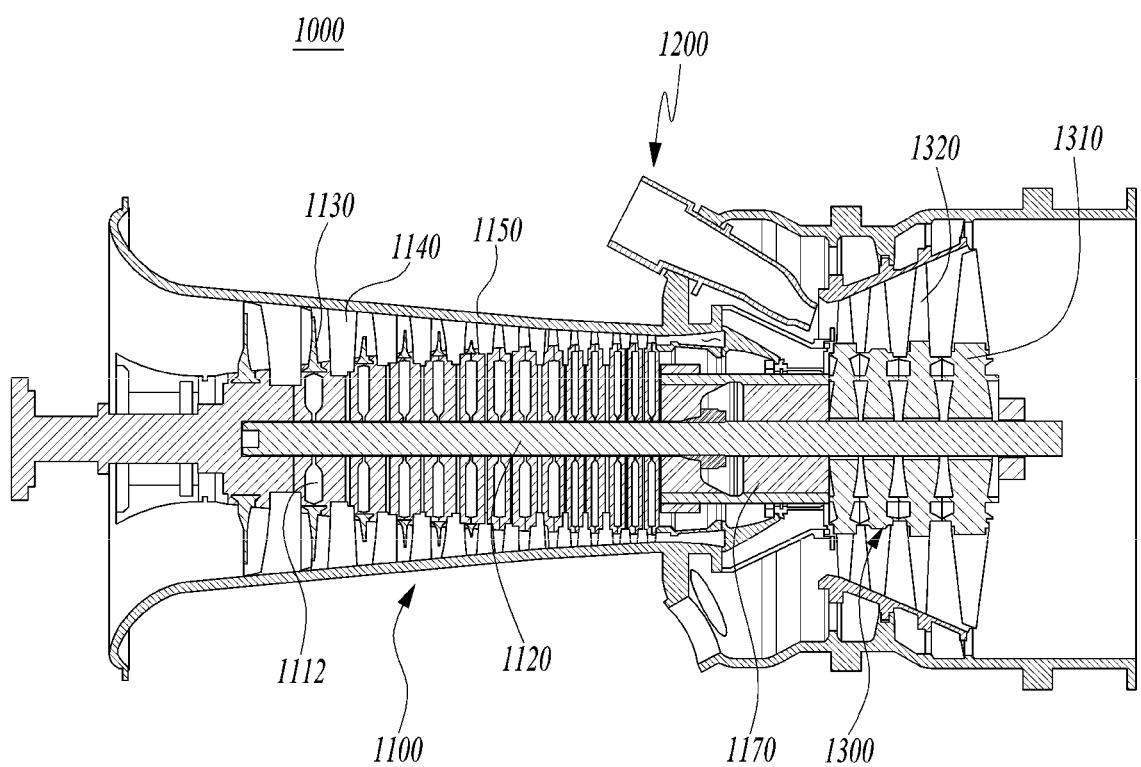
FIG. 2 is a longitudinal sectional view illustrating a portion of the gas turbine of FIG. 1.

FIG. 1 is a view illustrating an inside of a gas turbine according to an exemplary embodiment. FIG. 2 is a longitudinal sectional view illustrating a portion of the gas turbine of FIG. 1.

The thermodynamic cycle of the gas turbine 1000 according to an exemplary embodiment may ideally follow a Brayton cycle. The Brayton cycle consists of four phases including isentropic compression (i.e., an adiabatic compression), isobaric heat addition, isentropic expansion (i.e., an adiabatic expansion), and isobaric heat dissipation. In other words, in the Brayton cycle, a thermal energy may be released by combustion of fuel in an isobaric environment after the atmospheric air is sucked and compressed to a high pressure, hot combustion gas may be expanded to be converted into a kinetic energy, and an exhaust gas with residual energy may then be discharged to the atmosphere. The Brayton cycle consists of four processes, i.e., compression, heating, expansion, and exhaust.

The gas turbine 1000 using the Brayton cycle may include a compressor 1100, a combustor 1200, and a turbine 1300 as illustrated in FIG. 1. Although the following description is given with reference to FIG. 1, the present disclosure may be widely applied to a turbine engine having the same configuration as the gas turbine 1000 illustrated in FIG. 1.

Referring to FIGS. 1 and 2, the compressor 1100 of the gas turbine 1000 may suck and compress air from the outside. The compressor 1100 may supply the air compressed by compressor blades 1130 to the combustor 1200 and supply cooling air to a high-temperature region required for cooling in the gas turbine 1000. Here, because the air sucked into the compressor 1100 is subject to an adiabatic compression process therein, the pressure and temperature of the air passing through the compressor 1100 increase.

The compressor 1100 may be designed as a centrifugal compressor or an axial compressor. In general, the centrifugal compressor is applied to a small gas turbine, whereas the multistage axial compressor 1100 is applied to the large gas turbine 1000 as illustrated in FIG. 1 because it is necessary to compress a large amount of air. In the multistage axial compressor 1100, the compressor blades 1130 rotate along with the rotation of a center tie rod 1120 and a rotor disk 1112 to compress air introduced thereinto while moving the compressed air to rear-stage compressor vanes 1140. The air is compressed increasingly to a high pressure while passing through the compressor blades 1130 formed in a multistage manner.

A plurality of compressor vanes 1140 may be formed in a multistage manner and mounted in a housing 1150. The compressor vanes 1140 guide the compressed air moved from front-stage compressor blades 1130 to rear-stage compressor blades 1130. For example, at least a portion of the compressor vanes 1140 may be mounted so as to be rotatable within a fixed range for regulating the inflow rate of air or the like.

The compressor 1100 may be actuated by some of the power output from the turbine 1300. To this end, the rotary shaft of the compressor 1100 may be directly connected to the rotary shaft of the turbine 1300 by a torque tube 1170. In the large gas turbine 1000, the compressor 1100 may require about half of the power generated in the turbine 1300 to be actuated.

The combustor 1200 may mix the compressed air supplied from the compressor 1100 with fuel for isobaric combustion to produce high-energy combustion gas. That is, the combustor 1200 mixes the compressed air introduced thereinto with fuel and burn a mixture thereof to produce high-temperature and high-pressure combustion gas with high energy. The combustor 1200 increases the temperature of the combustion gas to a temperature at which components of the combustor and the turbine are able to be resistant to heat in the isobaric combustion process.

The combustor 1200 may consist of a plurality of combustors arranged in a form of a cell in the housing, and include a burner having a fuel injection nozzle and the like, a combustor liner defining a combustion chamber, and a transition piece that is a connection between the combustor and the turbine.

The high-temperature and high-pressure combustion gas output from the combustor 1200 is supplied to the turbine 1300. The high-temperature and high-pressure combustion gas supplied to the turbine 1300 applies impingement or reaction force to the turbine blades 1320 of the turbine 1300 while expanding, resulting in a rotational torque. The obtained rotational torque is transmitted via the torque tube 1170 to the compressor 1100, and power exceeding the power required to drive the compressor 1100 is used to drive a generator or the like.

The turbine 1300 includes a plurality of rotor disks 1310, a plurality of turbine blades 1320 radially arranged on each of the rotor disks 1310, and a retainer 1400 for sealing each of the turbine blades 1320. The turbine blade 1320 may be coupled to the rotor disk 1310 in a dovetail manner or the like. In addition, the rotor disk 1310 is provided with vanes fixed to the housing, and the vanes guide the flow direction of combustion gas passing through the turbine blades 1320.

Figure 3:
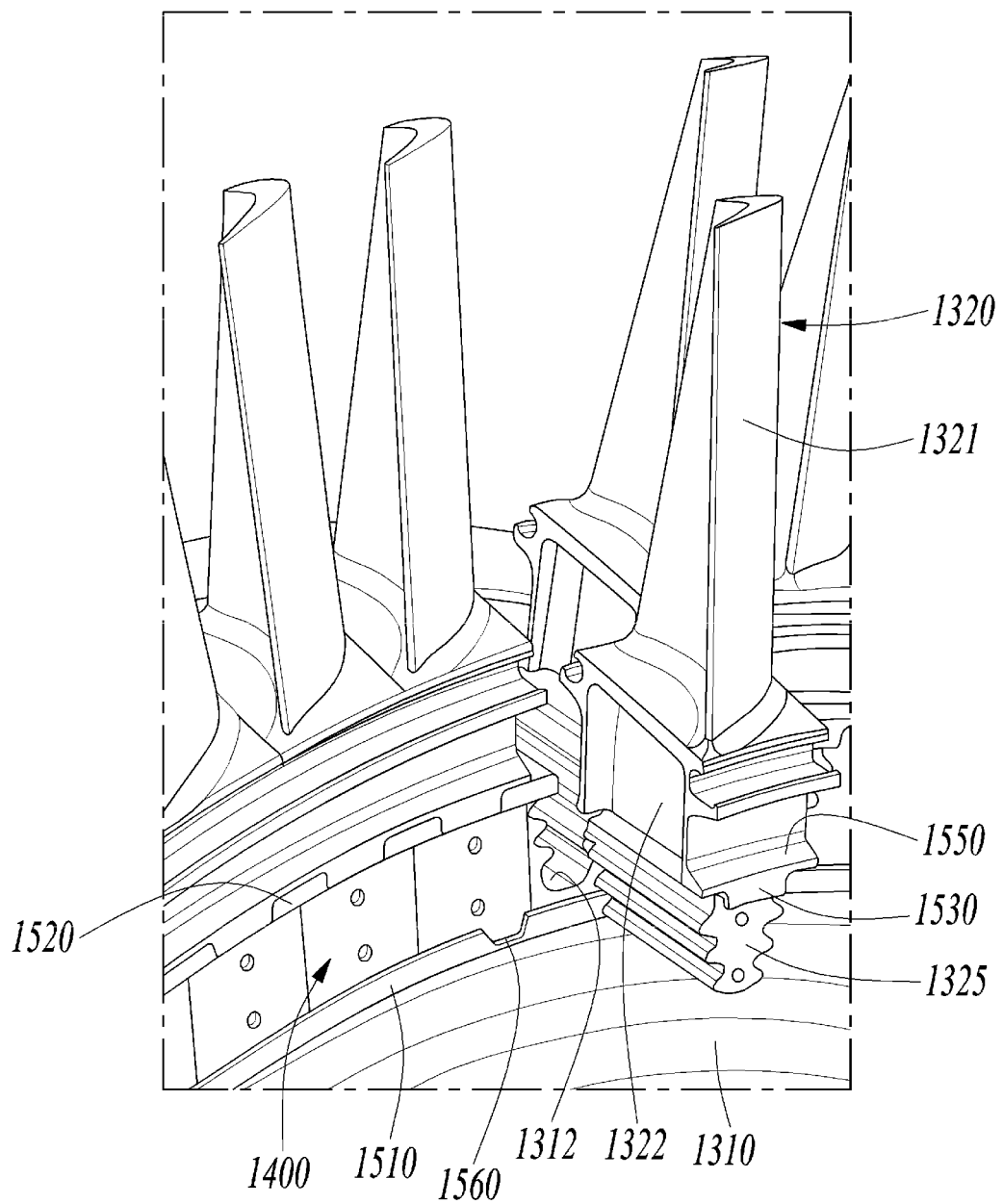
FIG. 3 is a perspective view illustrating a turbine blade and a rotor disk according to an exemplary embodiment.
Figure 4:
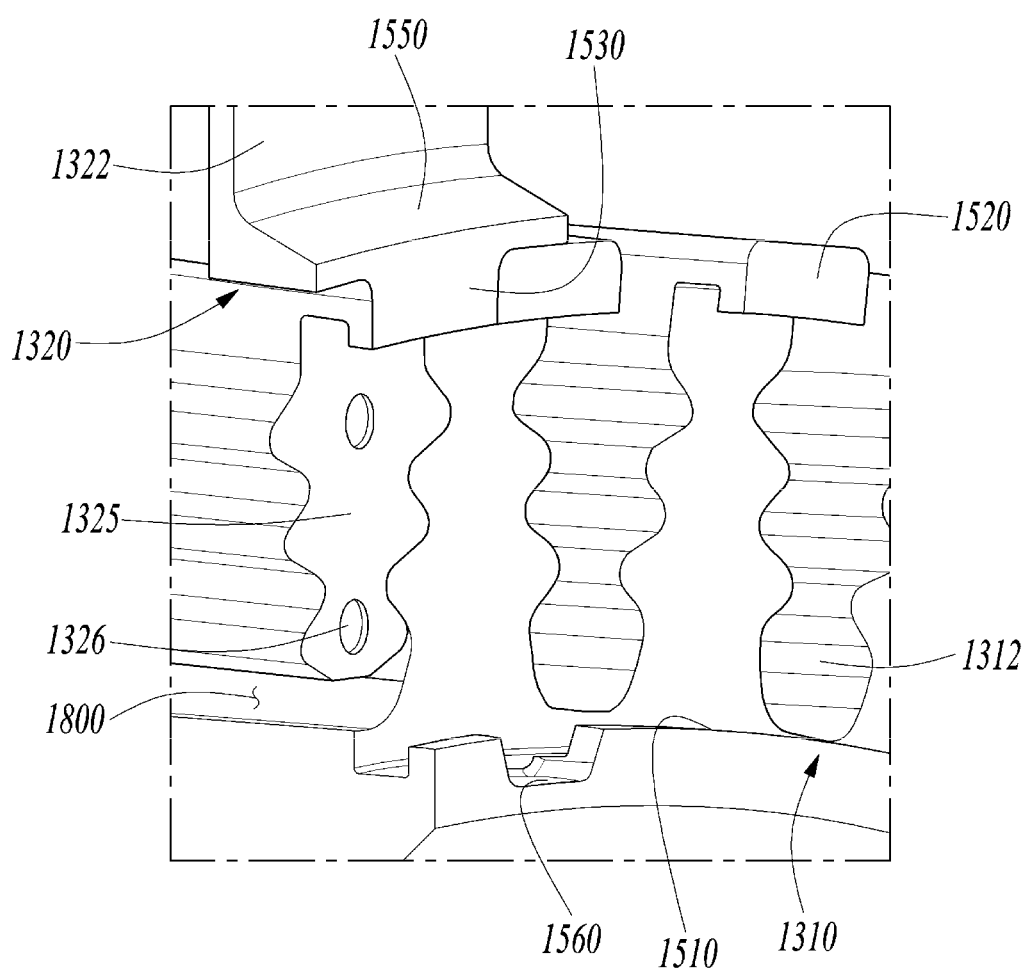
FIG. 4 is a perspective view illustrating a portion of the turbine blade and the rotor disk according to an exemplary embodiment.

FIG. 3 is a perspective view illustrating the turbine blade and the rotor disk according to an exemplary embodiment. FIG. 4 is a perspective view illustrating a portion of the turbine blade and the rotor disk according to an exemplary embodiment.

Referring to FIGS. 3 and 4, each rotor disk 1310 has a substantially disk shape, and has a plurality of slots 1312 formed on an outer peripheral portion thereof. Each of the slots 1312 has a fir-tree-shaped curved surface and each turbine blade 1320 is inserted into the associated slot 1312.

The turbine blade 1320 includes a plate-shaped blade part 1321, a platform part 1322 coupled (radially inward of the turbine) to a lower portion of the blade part 1321, and a root part 1325 protruding downward from the platform part 1322. The blade part 1321 may be formed of an airfoil-shaped curved plate and may have an airfoil shape optimized according to the specification of the gas turbine 1000. The blade part 1321 may have a leading edge positioned upstream and a trailing edge positioned downstream in the flow direction of combustion gas.

The blade part 1321 includes a plurality of film cooling holes formed on the surface thereof, and the film cooling holes communicate with a cooling passage defined in the blade part 1321 to supply cooling air to the surface of the blade part 1321.

The platform part 1322 may be positioned between the blade part 1321 and the root part 1325 and be formed of a substantially rectangular plate or a rectangular column shape. The side of the platform part 1322 is in contact with the side of the platform part 1322 of an adjacent turbine blade 1320, thereby serving to maintain the distance between the turbine blades 1320. A cooling passage 1800 may be defined in the blade part 1321, the platform part 1322, and the root part 1325 so that the cooling air from the rotor disk 1310 flows in the cooling passage 1800.

The root part 1325 has a substantially fir-tree-shaped curved portion corresponding to the curved portion formed in the slot 1312 of the rotor disk 1310. Here, the coupling structure of the root part 1325 does not necessarily have a fir-tree form, but may have a dovetail form. The root part 1325 has two fastening grooves 1326 spaced in a height direction apart from each other for insertion of fixtures 1430.

The rotor disk 1310 includes a lower hook 1510 and a disk hook 1520 located (radially outward of the rotor disk) above the lower hook 1510. The lower hook 1510 is located beneath the slot 1312 and may extend in the circumferential direction of the rotor disk 1310 to have an annular shape. The disk hook 1520 consists of a plurality of disk hooks intermittently spaced apart from each other and located between the slots 1312. In particular, the disk hook 1520 may be formed at the outer end of the rotor disk 1310.

The lower hook 1510 may have one detaching groove 1560 formed for installation of the retainer 1400. However, the present disclosure is not limited thereto, and a plurality of detaching grooves 1560 may be formed in the lower hook 1510, in which case the number of detaching grooves 1560 is preferably less than half of the number of retainers 1400.

The turbine blade 1320 includes a blade hook 1530 located above the lower hook 1510 and between the disk hooks 1520. The turbine blade 1320 has a support rib 1550 protruding from the side thereof, and the disk hook 1520 protrudes toward the lower portion of the turbine blade 1320 from the center of the support rib 1550. A side of the blade hook 1530 may contact with the disk hook 1520.

The support rib 1550 protrudes from the platform part 1322 and covers an upper surface of the disk hook 1520. The blade hook 1530 protrudes toward the lower hook 1510 from the support rib 1550. Forming the support rib 1550 enables the turbine blade 1320 to be stably coupled to the rotor disk 1310.

Figure 5:
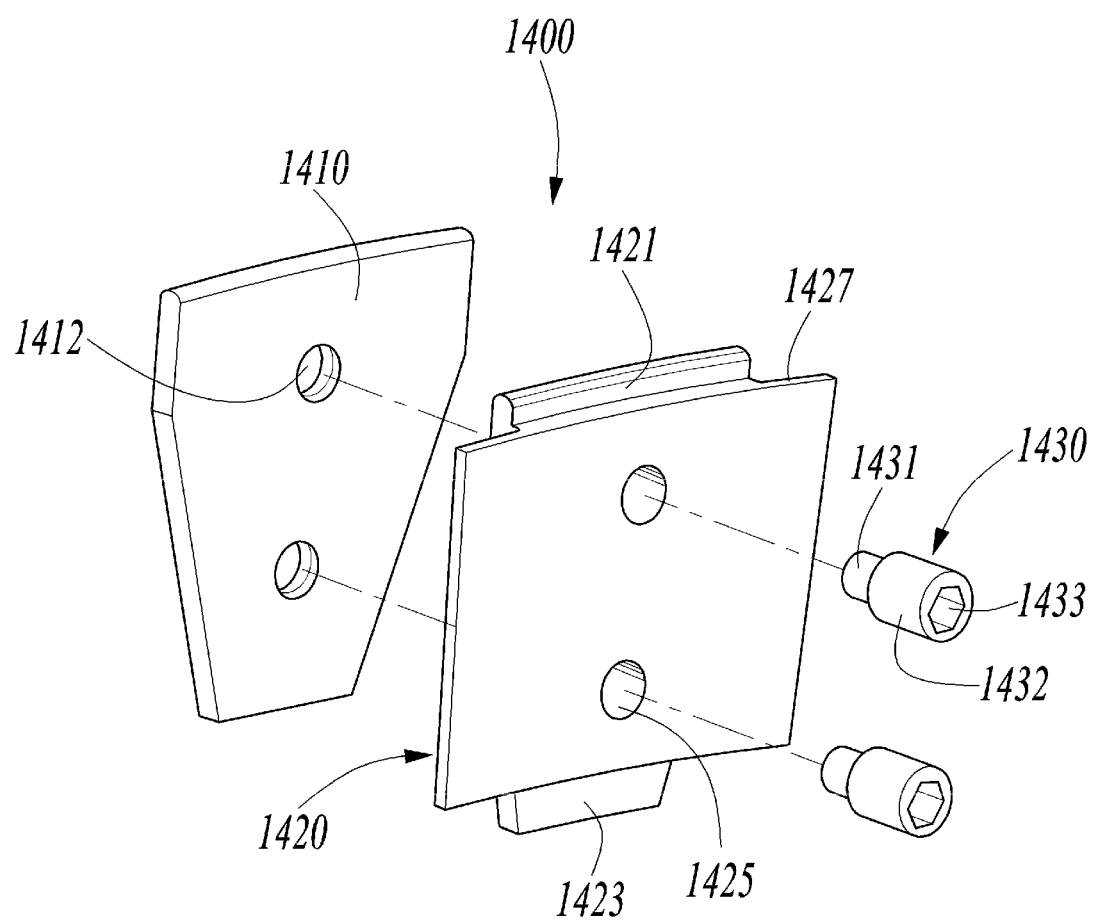
FIG. 5 is an exploded perspective view illustrating a retainer according to an exemplary embodiment.
Figure 6:
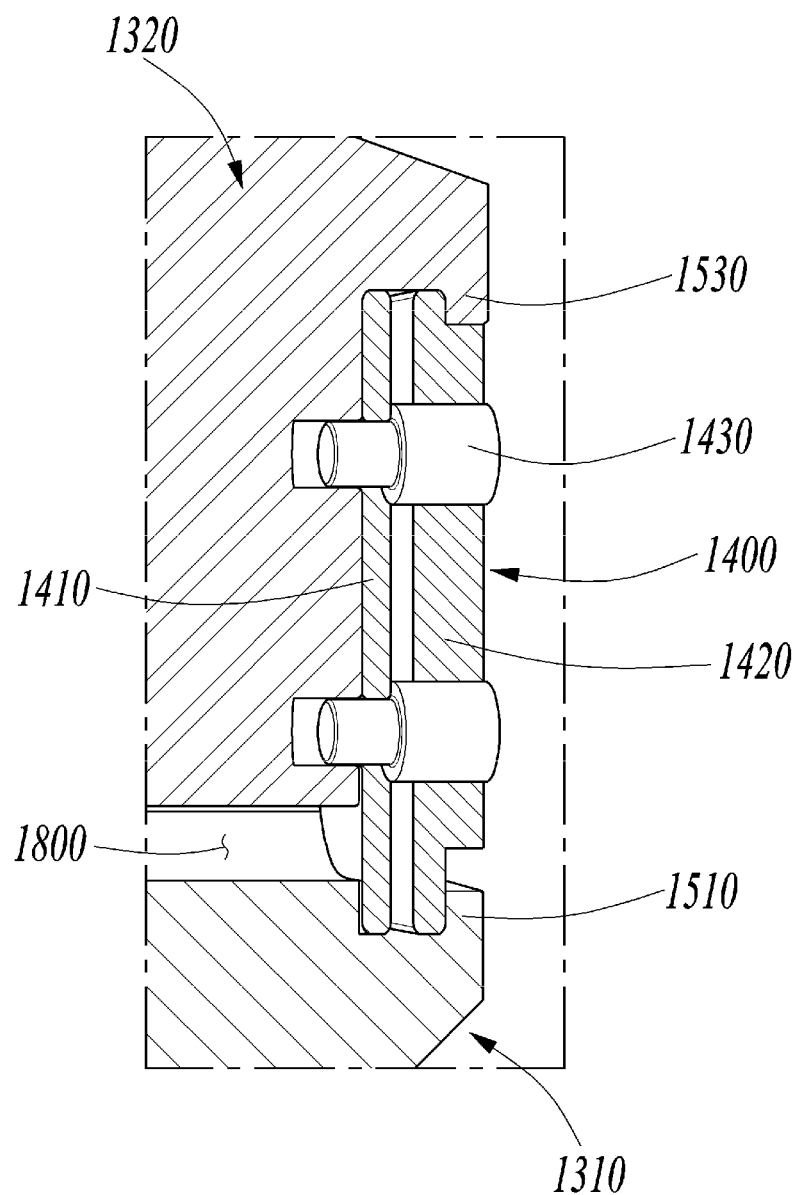
FIG. 6 is a longitudinal sectional view illustrating a state in which the retainer is fixed to the turbine blade and the rotor disk according to an exemplary embodiment.

FIG. 5 is an exploded perspective view illustrating a retainer according to an exemplary embodiment. FIG. 6 is a longitudinal sectional view illustrating a state in which the retainer is fixed to the turbine blade and the rotor disk according to an exemplary embodiment.

Referring to FIGS. 5 and 6, the retainer 1400 includes a sealing plate 1410 fixed to the turbine blade 1320, a stopper plate 1420 covering the sealing plate 1410, and fixtures 1430 pressing the sealing plate 1410 against the turbine blade 1320.

The sealing plate 1410 is formed of a substantially pentagonal plate. The sealing plate 1410 is longer, at an upper end thereof, than a lower end thereof, and has two first holes 1412 formed for insertion of the fixtures 1430. The first holes 1412 may be vertically spaced apart from each other.

The sealing plate 1410 is fixed to the root part 1325 of the turbine blade 1320 to seal the cooling passage 1800 defined between the turbine blade 1320 and the rotor disk 1310.

The stopper plate 1420 is spaced apart from the sealing plate 1410 and disposed to face the sealing plate 1410 in parallel therewith. The stopper plate 1420 includes an upper protrusion 1421 protruding upward and a lower protrusion 1423 protruding downward.

One retainer 1400 is coupled to one turbine blade 1320, and a width of the stopper plate 1420 is larger than that of the sealing plate 1410. The sealing plates 1410 are spaced apart from each other whereas the sides of the stopper plates 1420 are in contact with each other.

The upper and lower protrusions 1421 and 1423 may be positioned at the widthwise center of the stopper plate 1420. In addition, distance adjusting grooves 1427 opened toward the sealing plate 1410 are formed both side ends of the stopper plate 1420. The side ends of adjacent stopper plates 1420 may be inserted into the distance adjusting grooves 1427.

If the stopper plate 1420 is spaced apart from the sealing plate 1410, the stopper plate 1420 is pushed toward the sealing plate 1410 to overlap the side ends of the stopper plates 1420. Thus, a distance between centers of the stopper plates 1420 can be reduced. In addition, forming the distance adjusting grooves 1427 can control a degree of insertion because the side ends of the stopper plates 1420 are inserted into the distance adjusting grooves 1427.

Each of the upper and lower protrusions 1421 and 1423 has a smaller thickness than the body of the stopper plate 1420. The outer surface of the stopper plate 1420 may be located in the same plane as the outer surface of the lower hook 1510. This enables the stopper plate 1420 to block the space between the lower hook 1510, the disk hook 1520, and the blade hook 1530 and to protect the fixtures 1430, which results in minimizing frictional damage due to flow during rotation.

The upper protrusion 1421 may be supported on the inner surfaces of the disk hook 1520 and the blade hook 1530 and the lower protrusion 1423 may be supported on the inner surface of the lower hook 1510. The stopper plate 1420 has two second holes 1425 formed for insertion of the fixtures 1430. The second holes 1425 are spaced apart from each other in the height direction of the stopper plate 1420. Each of the first holes 1412 has a thread formed on the inner surface thereof, and no thread is formed on the inner surfaces of the second holes 1425.

Each of the fixtures 1430 includes a fastening part 1431 having a thread on the outer peripheral surface thereof, and a head part 1432 expanding outward from the fastening part 1431 and having a larger cross-sectional area than the fastening part 1431. The fastening part 1431 has a column shape and may be screwed to the sealing plate 1410 and the turbine blade 1320.

The head part 1432 abuts on the sealing plate 1410 to press the sealing plate 1410 against the turbine blade 1320. The head part 1432 has a gripping groove 1433 formed on the upper surface thereof such that a tool such as a wrench or a screwdriver may be inserted thereinto. The head part 1432 is inserted into the stopper plate 1420 but is not screwed thereto.

The fixture 1430 is inserted into the associated fastening groove 1326 and the associated first hole 1412 to press the sealing plate 1410, thereby sealing the cooling passage 1800 defined between the turbine blade 1320 and the rotor disk 1310. In this case, because the fixture 1430 is not screwed to the stopper plate 1420, the stopper plate 1420 is spaced apart from the sealing plate 1410 so that a space is defined between the sealing plate 1410 and the stopper plate 1420.

Accordingly, the stopper plate 1420 is not pressed toward the sealing plate 1410 and it is supported only by the disk hook 1520, the blade hook 1530, and the lower hook 1510. In addition, because the sides of the stopper plates 1420 are in contact with each other, the stopper plates 1420 may be supported in the circumferential direction of the rotor disk 1310.

Figure 7:
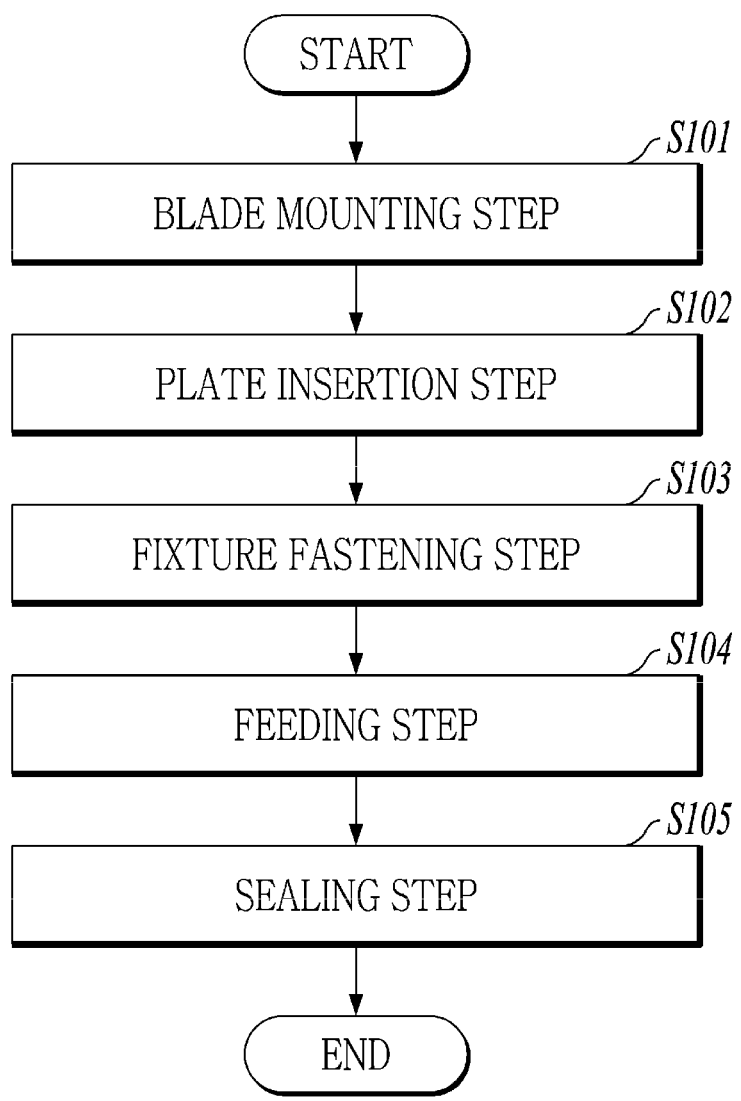
FIG. 7 is a flowchart for explaining a method of assembling a turbine according to an exemplary embodiment.

Hereinafter, a method of assembling the turbine according to an exemplary embodiment will be described. FIG. 7 is a flowchart for explaining the method of assembling the turbine according to an exemplary embodiment.

Referring to FIG. 7, the method of assembling the turbine may include a blade mounting step (operation S101), a plate insertion step (operation S102), a fixture fastening step (operation S103), a feeding step (operation S104), and a sealing step (operation S105).

In the blade mounting step (operation S101), the turbine blade 1320 is inserted into the slot 1312 formed in the rotor disk 1310. The rotor disk 1310 may include a plurality of slots 1312 circumferentially spaced apart from each other, and the turbine blade 1320 is inserted into each of the slots 1312.

In the plate insertion step (operation S102), the sealing plate 1410 and the stopper plate 1420 are inserted between the lower hook 1510, the disk hook 1520, and the blade hook 1530 through the detaching groove 1560 formed in the lower hook 1510. The stopper plate 1420 is inserted so as to overlap with the sealing plate 1410, and the first holes 1412 formed in the sealing plate 1410 face the second holes 1425 formed in the stopper plate 1420.

In the fixture fastening step (operation S103), the fixtures 1430 are fastened to the sealing plate 1410 and the stopper plate 1420. For example, the fixtures 1430 are inserted into the first holes 1412 through the second holes 1425 and screwed thereto.

In the feeding step (operation S104), the sealing plate 1410 and the stopper plate 1420 supported by the blade hook 1530, the disk hook 1520, and the lower hook 1510 are moved in the circumferential direction of the rotor disk 1310. Because the sealing plate 1410 and the stopper plate 1420 are coupled to each other by the fixtures 1430, they may be moved together in the circumferential direction of the rotor disk 1310. In addition, because the blade hook 1530, the disk hook 1520, and the lower hook 1510 form a rail, the sealing plate 1410 and the stopper plate 1420 may be easily moved.

In the sealing step (operation S105), the fixtures 1430 are fastened to the turbine blade 1320 so that the head parts 1432 presses the sealing plate 1410. The fixtures 1430 are coupled to the fastening grooves 1326 of the turbine blade 1320, thereby enabling the sealing plate 1410 to be pressed against the turbine blade 1320.

Figure 8:
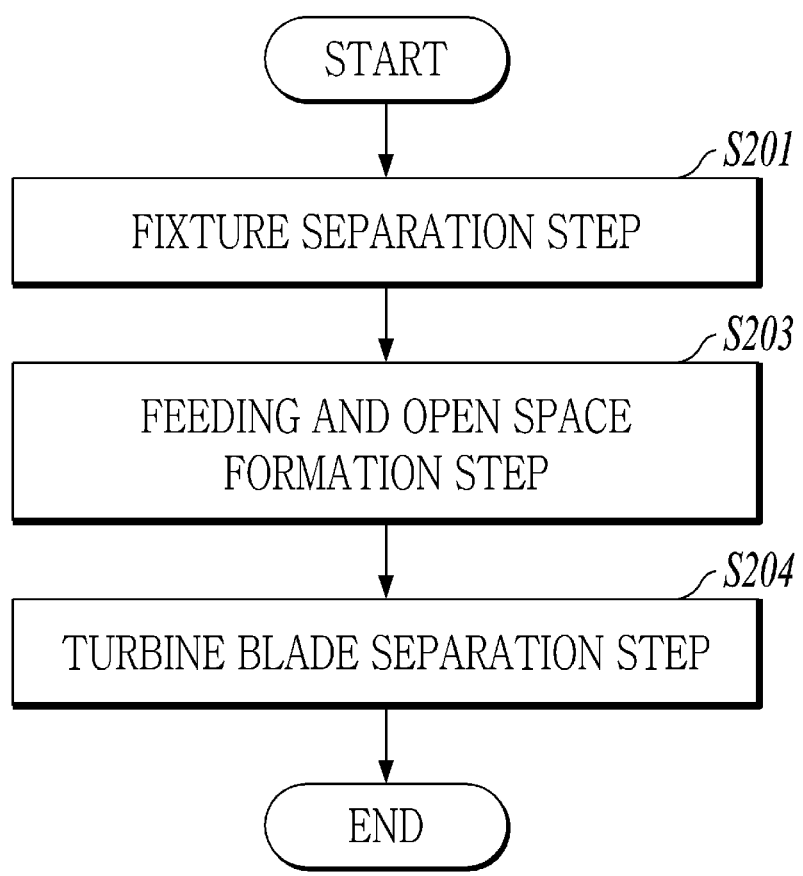
FIG. 8 is a flowchart for explaining a method of disassembling a turbine according to an exemplary embodiment.
Figure 9:
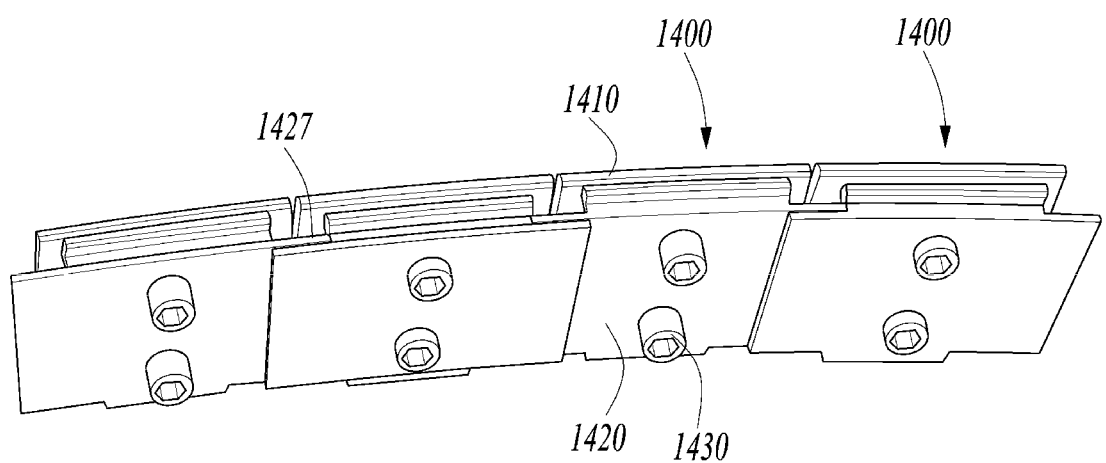
FIG. 9 is a view illustrating a state in which retainers are overlapped according to an exemplary embodiment.

FIG. 8 is a flowchart for explaining a method of disassembling the turbine according to an exemplary embodiment. FIG. 9 is a view illustrating a state in which the retainers are overlapped according to an exemplary embodiment.

Referring to FIGS. 8 and 9, the method of disassembling the turbine may include a fixture separation step (operation S201), a feeding and open space formation step (operation S202), and a turbine blade separation step (operation S203).

In the fixture separation step (operation S101), the fixtures 1430 which fix the sealing plate 1410 and the stopper plate 1420 are separated from the turbine blade 1320. The fixtures 1430 are screwed to the sealing plate 1410 and the turbine blade 1320 through the stopper plate 1420. Accordingly, the fixtures 1430 are unscrewed and separated from the turbine blade 1320, but they are kept inserted into the sealing plate 1410.

In the feeding and open space formation step (operation S202), the stopper plate 1420 is pressed so that the side end thereof is inserted between adjacent stopper plates 1420. Thus, the distance between the centers of the stopper plates 1420 is reduced to define an open space.

As illustrated in FIG. 9, when any one of the stopper plates 1420 spaced apart from the sealing plate 1410 is pressed and moved toward the sealing plate 1410 and the pressed stopper plate 1420 is circumferentially moved, the stopper plate 1420 may be inserted into the distance adjusting groove 1427 formed on the rear surface of the adjacent stopper plate 1420. If the side ends of the plurality of stopper plates 1420 are disposed to overlap with each other, an open space is defined and the root part 1325 of the turbine blade 1320 intended for separation is exposed.

In the turbine blade separation step (operation S203), the exposed turbine blade 1320 is separated from the rotor disk 1310. In For example, the root part 1325 of the turbine blade 1320 is removed from the slot 1312, and the turbine blades 1320 may be sequentially separated or only one damaged turbine blade 1320 may be separated during the circumferential movement of the retainers 1400.

The rotor disk 1310 may be made of a nickel alloy having a high strength such as Inconel, and it takes much time and cost to form the detaching groove 1560 corresponding to the number of retainers 1400 in the rotor disk 1310 made of a high-strength alloy. However, because the blade hook 1530, the disk hook 1520, and the lower hook 1510 are formed, the retainer 1400 is easily movable in the circumferential direction of the rotor disk 1310. Therefore, the turbine 1300 can be assembled or disassembled through one or a few detaching grooves 1560.

Figure 10:
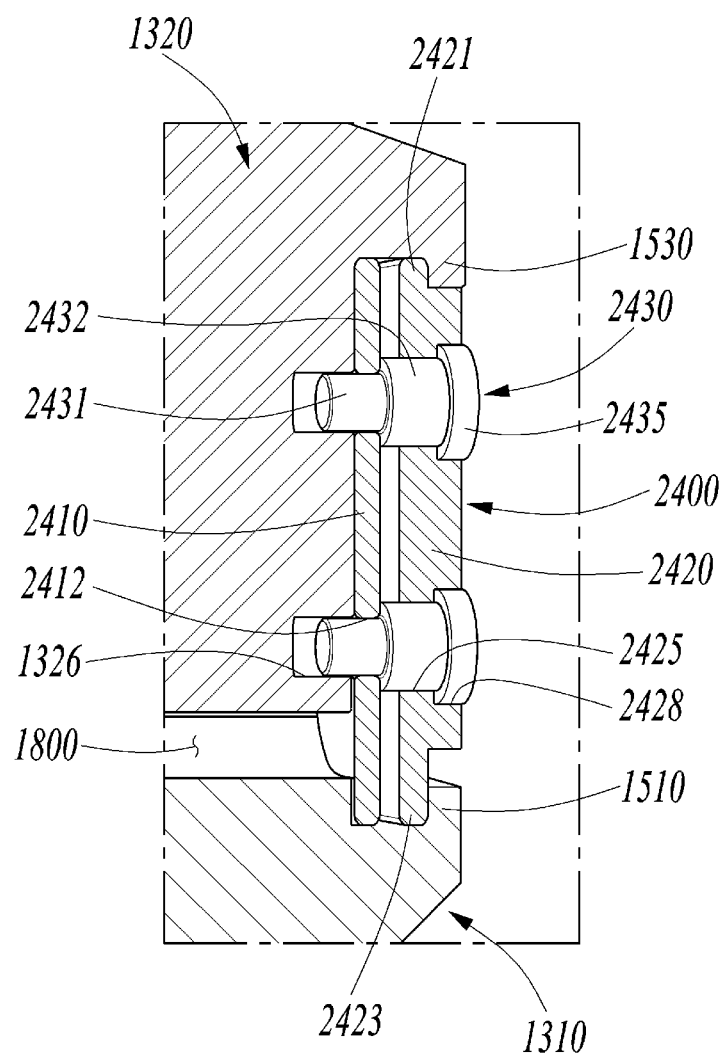
FIG. 10 is a longitudinal sectional view illustrating a state in which a retainer is fixed to a turbine blade and a rotor disk according to another exemplary embodiment.

Hereinafter, a gas turbine according to another exemplary embodiment will be described. FIG. 10 is a longitudinal sectional view illustrating a state in which a retainer is fixed to a turbine blade and a rotor disk according to another exemplary embodiment.

Referring to FIG. 10, a retainer 2400 includes a sealing plate 2410 fixed to the turbine blade 1320, a stopper plate 2420 covering the sealing plate 2410, and fixtures 2430 pressing the sealing plate 2410 against the turbine blade 1320.

The sealing plate 2410 is formed of a substantially pentagonal plate. The sealing plate 1410 is longer, at an upper end thereof, than a lower end thereof, and has two first holes 2412 formed for insertion of the fixtures 2430. The first holes 2412 may be vertically spaced apart from each other.

The sealing plate 2410 is fixed to the root part 1325 of the turbine blade 1320 to seal the cooling passage 1800 defined between the turbine blade 1320 and the rotor disk 1310.

The stopper plate 2420 is spaced apart from the sealing plate 2410 and disposed to face the sealing plate 2410 in parallel therewith. The stopper plate 2420 includes an upper protrusion 2421 protruding upward and a lower protrusion 2423 protruding downward.

The upper protrusion 2421 may be supported on the inner surfaces of the disk hook 1520 and the blade hook 1530 and the lower protrusion 2423 may be supported on the inner surface of the lower hook 1510. The stopper plate 2420 has two second holes 2425 formed for insertion of the fixtures 2430. The second holes 2425 are spaced apart from each other in the height direction of the stopper plate 2420. Each of the first holes 1412 has a thread formed on the inner surface thereof, and no thread is formed on the inner surfaces of the second holes 1425. Meanwhile, the stopper plate 2420 has stepped grooves 2428 on the outer surface thereof. Each of the stepped grooves 2428 is connected to an associated one of the second holes 2425 and extends along the circumference of the second hole 2425. The stepped groove 2426 has an expanded structure outward from the second hole 2425.

Each of the fixtures 2430 includes a fastening part 2431 having a thread on the outer peripheral surface thereof, and a head part 2432 expanding outward from the fastening part 2431 and having a larger cross-sectional area than the fastening part 2431. The fastening part 2431 has a column shape and may be screwed to the sealing plate 2410 and the turbine blade 1320.

The head part 2432 abuts on the sealing plate 2410 to press the sealing plate 2410 against the turbine blade 1320. The head part 2432 includes a flange part 2435 protruding laterally and inserted into the associated stepped groove 2428. The flange part 2435 has an annular shape extending in the circumferential direction of the head part 2432 and is inserted into the stepped groove 2428 to support the stopper plate 2420. The head part 2432 has a gripping groove formed on the upper surface thereof such that a tool such as a wrench or a screwdriver may be inserted thereinto. The head part 2432 is inserted into the stopper plate 2420 but is not screwed thereto.

The fixture 2430 is inserted into the fastening groove 1326 and the first hole 2412 to press the sealing plate 2410, thereby sealing the cooling passage 1800 defined between the turbine blade 1320 and the rotor disk 1310. In this case, because the fixture 2430 is not screwed to the stopper plate 2420, the stopper plate 2420 is spaced apart from the sealing plate 2410 so that a space is defined between the sealing plate 2410 and the stopper plate 2420.

If the flange part 2435 is formed in the fixture 2430, the stopper plate 2420 can be stably supported by the flange part 2435 as well as supported by the blade hook 1530, the disk hook 1520, and the lower hook 1510.

Figure 11:
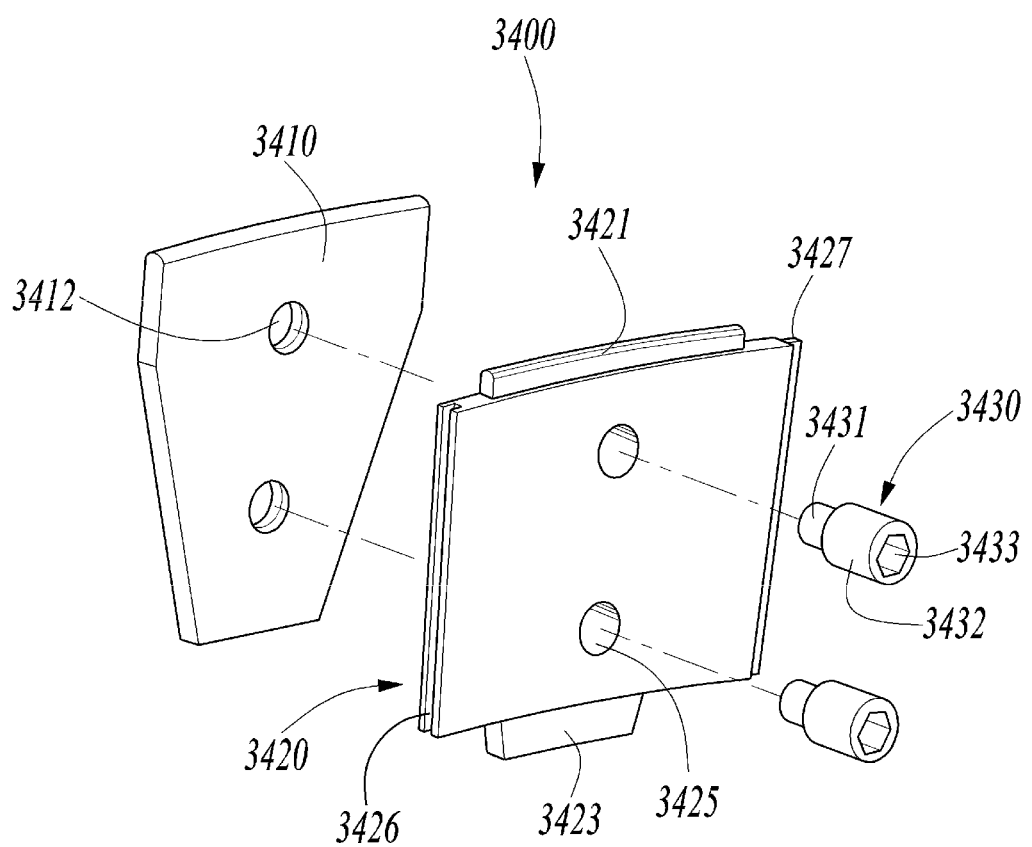
FIG. 11 is an exploded perspective view illustrating a retainer according to another exemplary embodiment.
Figure 12:
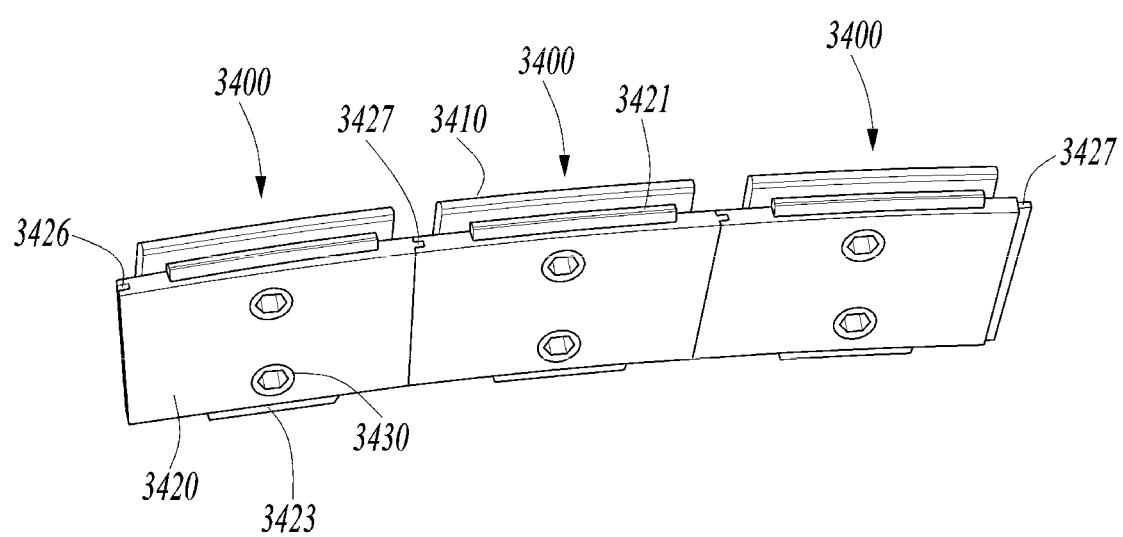
FIG. 12 is a perspective view illustrating a state in which retainers are coupled to each other according to another exemplary embodiment.

Hereinafter, a gas turbine according to another exemplary embodiment will be described. FIG. 11 is an exploded perspective view illustrating a retainer according to another exemplary embodiment. FIG. 12 a perspective view illustrating a state in which retainers are coupled to each other according to another exemplary embodiment.

Referring to FIGS. 11 and 12, a retainer 3400 includes a sealing plate 3410 fixed to the turbine blade 1320, a stopper plate 3420 covering the sealing plate 3410, and fixtures 3430 pressing the sealing plate 3410 against the turbine blade 1320.

The sealing plate 3410 is formed of a substantially pentagonal plate. The sealing plate 3410 is longer, at an upper end thereof, than a lower end thereof, and has first holes 3412 formed for insertion of the fixtures 3430. The first holes 3412 may be vertically spaced apart from each other. The sealing plate 3410 is fixed to the root part 1325 of the turbine blade 1320 to seal the cooling passage 1800 defined between the turbine blade 1320 and the rotor disk 1310.

The stopper plate 3420 is spaced apart from the sealing plate 3410 and disposed to face the sealing plate 3410 in parallel therewith. The stopper plate 3420 includes an upper protrusion 3421 protruding upward and a lower protrusion 3423 protruding downward.

The upper and lower protrusions 3421 and 3423 may be positioned at the widthwise center of the stopper plate 3420. The stopper plate 3420 has two second holes 3425 formed for insertion of the fixtures 3430. The second holes 3425 are spaced apart from each other in the height direction of the stopper plate 3420. Each of the first holes 3412 has a thread formed on the inner surface thereof, and no thread is formed on the inner surfaces of the second holes 3425.

The stopper plate 3420 has a support groove 3426 formed on one side thereof and a support protrusion 3427 formed on the other side thereof. The support groove 3426 may extend in the height direction of the stopper plate 3420 and the support protrusion 3427 may also extend in the height direction of the stopper plate 3420.

The support protrusion 3427 of the adjacent stopper plate 3420 may be inserted into the support groove 3426, and the stopper plate 3420 may thus be maintained in the state in which it is spaced apart from the sealing plate 3410.

Each of the fixtures 3430 includes a fastening part 3431 having a thread on the outer peripheral surface thereof, and a head part 3432 expanding outward from the fastening part 3431 and having a larger cross-sectional area than the fastening part 3431.

The head part 3432 abuts on the sealing plate 3410 to press the sealing plate 3410 against the turbine blade 1320. The head part 3432 has a gripping groove 3433 formed on the upper surface thereof such that a tool such as a wrench or a screwdriver may be inserted thereinto.

If the side ends of the stopper plates 3420 are fitted to each other, it is possible to prevent the stopper plate 3420 from moving toward the sealing plate 3410 due to an impact during operation. In order to reduce the distance between the stopper plates 3420, the stopper plate 3420 is laterally pushed to remove any one of the support protrusions 3427 from the support groove 3426, and then the stopper plate 3420 is moved backward, thereby enabling the side ends of the stopper plates 3420 to be overlapped.

As is apparent from the above description, in accordance with the turbine and the gas turbine according to the exemplary embodiments, because the lower hook and the blade hook are formed in the turbine blade, it is possible to perform easy assembly and stable sealing.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A turbine comprising:
a rotor disk having a lower hook;
a plurality of turbine blades installed on an outer peripheral surface of the rotor disk, each of the turbine blades having a blade hook located above the lower hook; and
a retainer sealing a cooling passage defined between the turbine blade and the rotor disk and supported by the blade hook and the lower hook,
wherein the rotor disk includes a disk hook located between the blade book and an adjacent blade hook, and the retainer is supported at an upper end by the blade book and the disk hook,
wherein the retainer comprises a sealing plate fixed to the turbine blade, a stopper plate spaced apart from the sealing plate to face the sealing plate, and a fixture inserted into the sealing plate and the turbine blade to press the sealing plate against the turbine blade, and
wherein the stopper plate is latched by the blade hook, the disk hook, and the lower hook.

2. The turbine according to claim 1, wherein the sealing plate is coupled to each of the turbine blades, the sealing plate is spaced apart from an adjacent sealing plate, and a side of the stopper plate is in contact with a side of an adjacent stopper plate.

3. The turbine according to claim 1, wherein the fixture comprises a fastening part having a thread on an outer peripheral surface and a head part coupled to the fastening part to press the sealing plate, and the head part is installed through the stopper plate.

4. The turbine according to claim 1, wherein:
the stopper plate includes a hole formed for insertion of the fixture and a stepped groove expanded outward on a circumference of the hole, the fixture comprises a fastening part having a thread on an outer peripheral surface and a head part coupled to the fastening part to press the sealing plate, and the head part includes a flange part protruding and inserted into the stepped groove.

5. The turbine according to claim 1, wherein the turbine blade further comprises an airfoil-shaped blade part, a root part inserted into a slot formed in the rotor disk, and a platform part located between the blade part and the root part, and the blade hook protrudes from the platform part.

6. The turbine according to claim 5, wherein the turbine blade further comprises a support rib covering the disk hook, and the blade hook protrudes downward from the support rib.

7. The turbine according to claim 1, wherein the stopper plate is fitted to adjacent stopper plates.

8. The turbine according to claim 7, wherein the stopper plate includes a support groove formed on one side thereof and a support: protrusion formed on the other side thereof, the support protrusion being inserted into a support groove of an adjacent stopper plate.

9. The turbine according to claim 1, wherein the lower hook includes a detaching groove formed for installation of the retainer.

10. A gas turbine comprising:
a compressor configured to compress air introduced from an outside;
a combustor configured to mix compressed air compressed by the compressor with fuel for combustion; and
a turbine,
wherein the turbine comprises:
a rotor disk having a plurality of slots formed therein,
a plurality of turbine blades rotated by combustion gas produced by the combustor, each of the turbine blades being inserted into an associated one of the slots, and
a retainer sealing a cooling passage defined between the rotor disk and the turbine blade, and
wherein the retainer is supported at an upper and a lower ends by a hook formed on the rotor disk and a hook formed on the turbine blade,
wherein the rotor disk comprises a lower hook and a disk hook located above the lower hook, the lower hook being formed to extend and the disk hook being intermittently formed, the turbine blade comprises a blade hook located between the disk hook and an adjacent disk hook, and the upper end of the retainer is supported by the disk hook and the blade hook, and the lower end of the retainer is supported by the lower hook, and wherein the retainer comprises a sealing plate fixed to the turbine blade, a fixture inserted into the sealing plate and the turbine blade to press the sealing plate against the turbine blade, and a stopper plate covering the sealing plate and latched by the disk hook, the blade hook, and the lower hook.

11. The gas turbine according to claim 10, wherein the sealing plate is coupled to each of the turbine blades, the sealing plate is spaced apart from an adjacent sealing plate, and a side of the stopper plate is in contact with a side of an adjacent stopper plate.

12. The gas turbine according to claim 10, wherein the stopper plate is spaced apart from the sealing plate.

13. The gas turbine according to claim 10, wherein the stopper plate is fitted to adjacent stopper plates.

14. The gas turbine according to claim 10, wherein the lower hook includes a detaching groove formed for installation of the retainer.

15. A method of assembling a turbine comprising a turbine blade having a blade hook and a rotor disk having a disk hook and a lower hook, the method comprising:
inserting the turbine blade into a slot formed in the rotor disk;
inserting a sealing plate and a stopper plate between the lower hook, the disk hook, and the blade hook through a detaching groove formed in the lower hook;
fastening a fixture to the sealing plate and the stopper plate;
moving the sealing plate and the stopper plate, which are supported by the blade hook, the disk hook, and the lower hook, in a circumferential direction of the rotor disk; and
fastening the fixture to the turbine blade to press the sealing plate by a head part of the fixture.

16. A method of disassembling a turbine comprising a turbine blade having a blade hook and a rotor disk having a disk hook and a lower hook, the method comprising:
separating a fixture, which fixes a sealing plate and a stopper plate, from the turbine blade;
pressing the stopper plate to insert side ends between adjacent stopper plates and reduce a distance between centers of the stopper plates and define an open space; and
separating an exposed turbine blade from the rotor disk.

* * * * *